Jan. 3, 1939.  C. P. SCHLEGEL  2,142,258
WEATHER STRIPPING AND THE LIKE
Filed Feb. 11, 1937  4 Sheets—Sheet 1
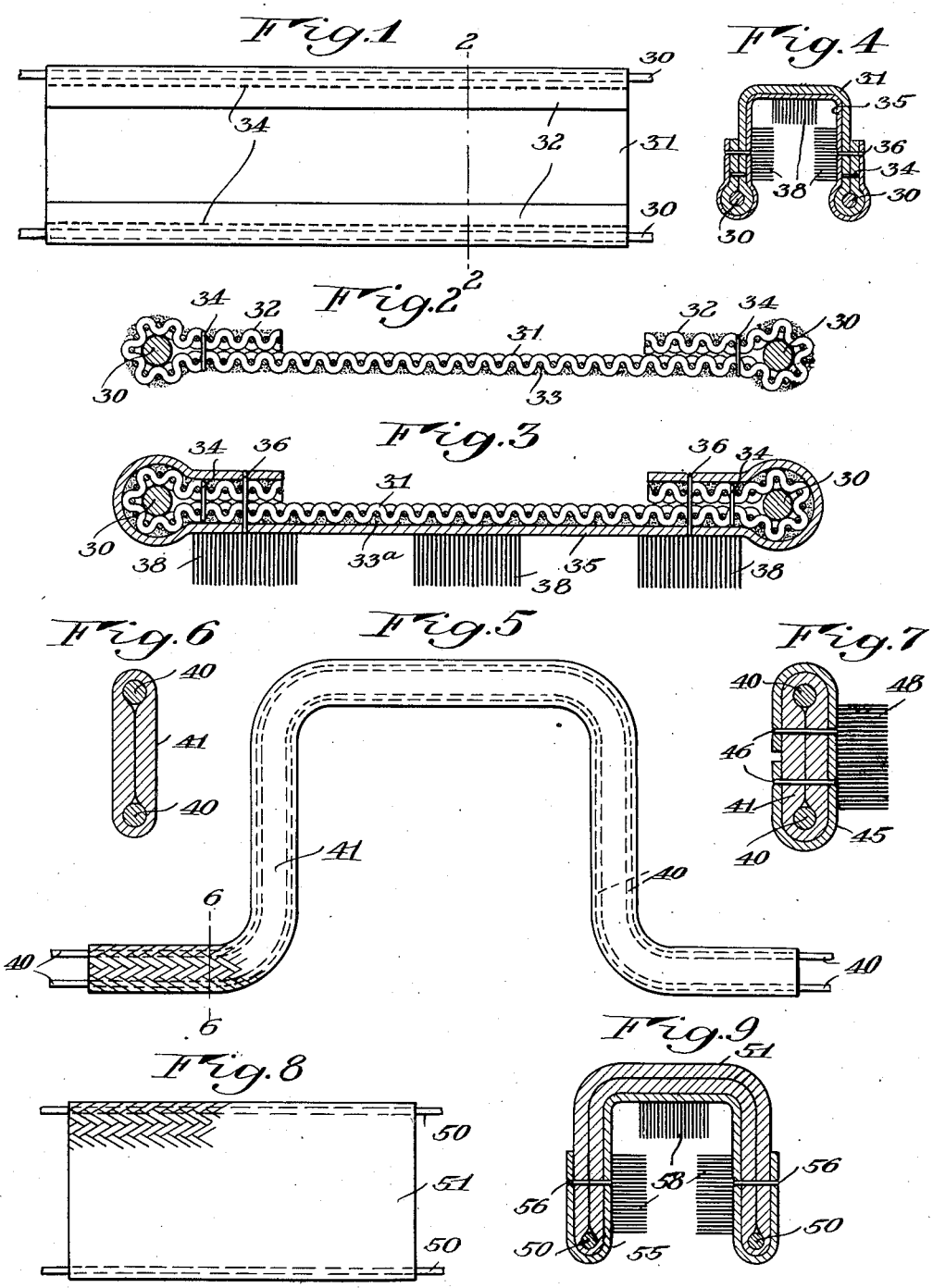

Jan. 3, 1939. C. P. SCHLEGEL 2,142,258
WEATHER STRIPPING AND THE LIKE
Filed Feb. 11, 1937 4 Sheets-Sheet 2
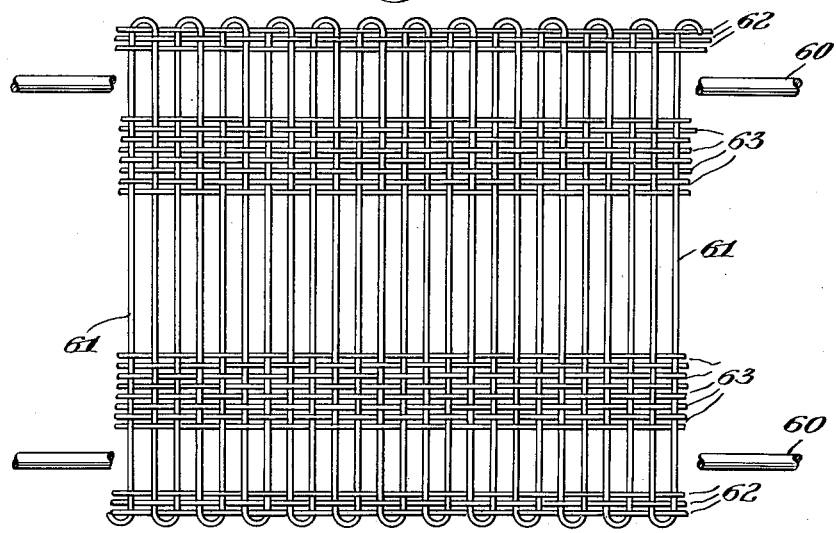
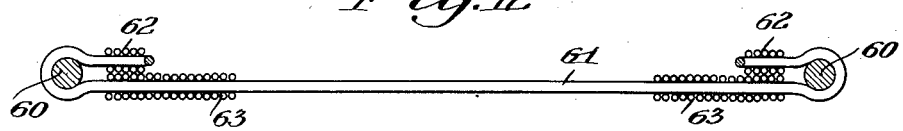
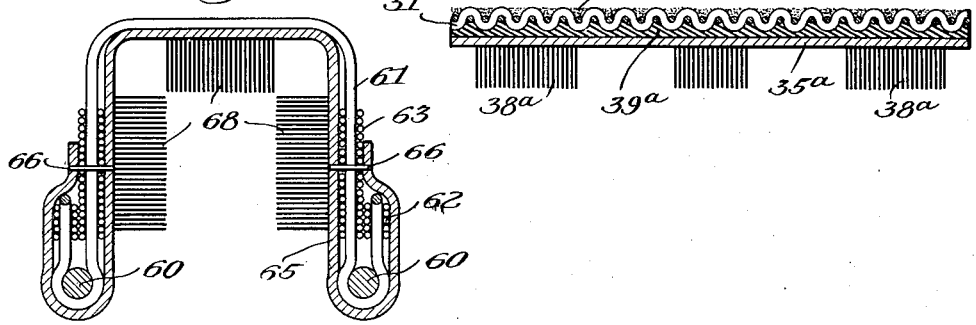
INVENTOR.
Charles P. Schlegel
BY Cumpston & Shepard
his ATTORNEYS Jan. 3, 1939.  C. P. SCHLEGEL  2,142,258
WEATHER STRIPPING AND THE LIKE
Filed Feb. 11, 1937  4 Sheets-Sheet 3
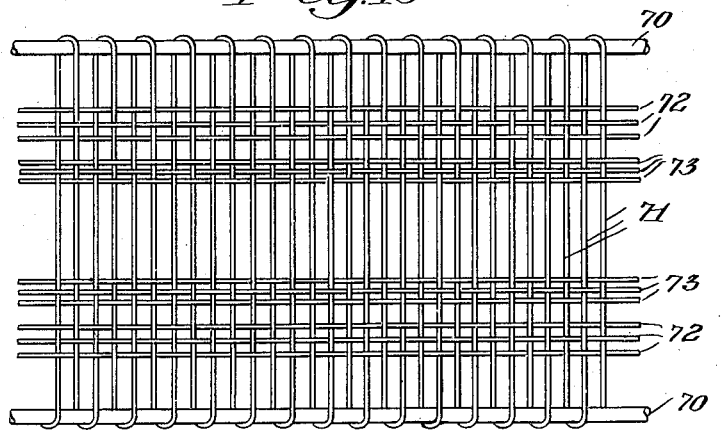
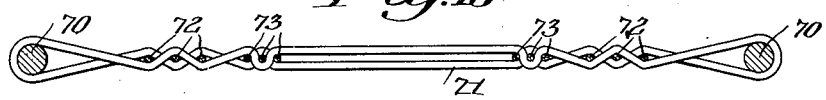
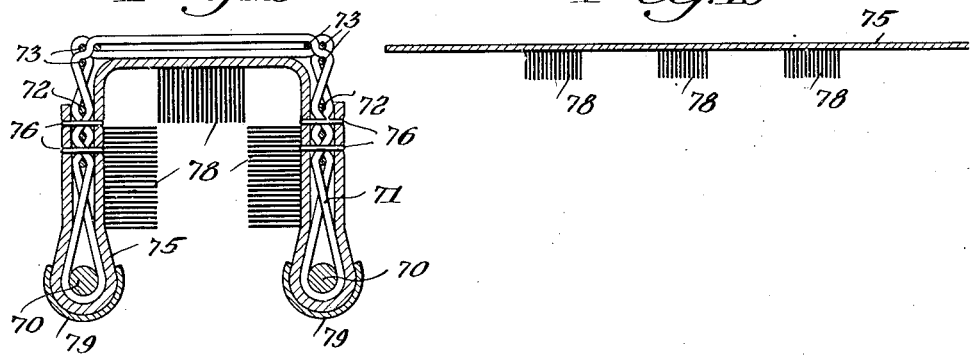
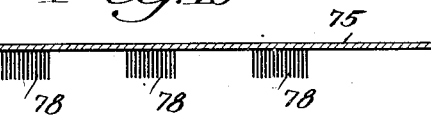
INVENTOR.
Charles P. Schlegel
BY Cumpston & Shepard
his ATTORNEYS

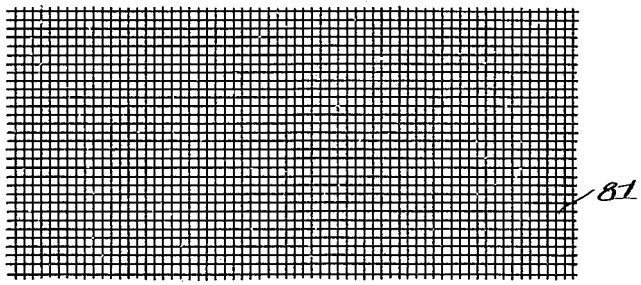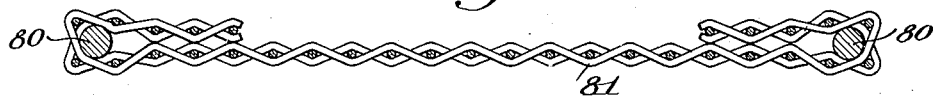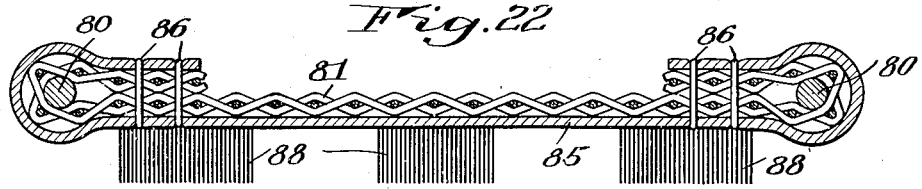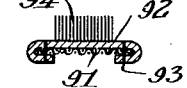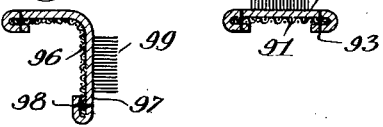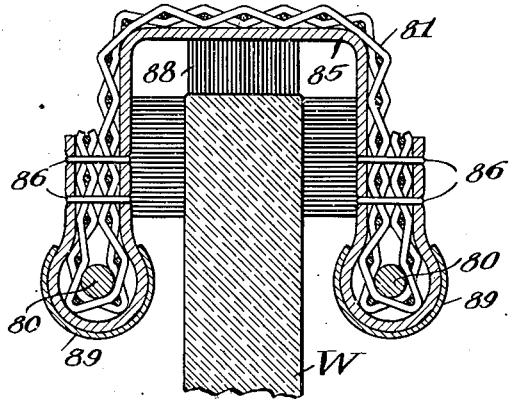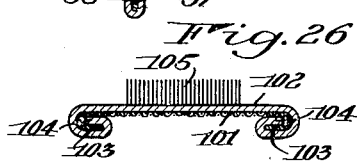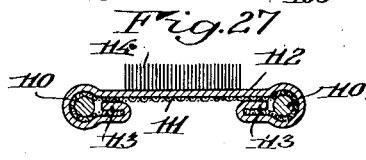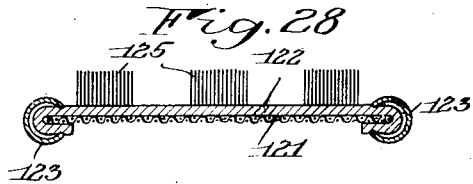

Patented Jan. 3, 1939

2,142,258

UNITED STATES PATENT OFFICE 2,142,258

WEATHER STRIPPING AND THE LIKE

Charles P. Schlegel, Rochester, N. Y., assignor to The Schlegel Manufacturing Company, Rochester, N. Y., a corporation of New York Application February 11, 1937, Serial No. 125,288

8 Claims. (Cl. 296—44.5)

This invention relates to weather stripping and similar constructions such as window guiding and cushioning strips, window channels, and the like.

An object of the invention is the provision of generally improved and more satisfactory constructions for weather stripping, window channels, and the like.

Another object of the invention is the provision of an improved backing construction capable of being readily bent to conform to any desired shape, which backing construction forms a base to which a facing is applied.

Still another object is the provision of a backing construction which is simple and relatively inexpensive to manufacture, and sturdy in use.

A further object is the provision of weather stripping and the like, capable of being bent to conform to any desired shape, having stiffening means running along both edges of the strip for adequately stiffening it and holding it in proper alinement in any shape to which it is bent.

To these and other ends the invention resides in certain improvements and combinations of parts, all as will be hereinafter more fully described, the novel features being pointed out in the claims at the end of the specification.

In the drawings:

Fig. 1 is a plan of a backing strip constructed in accordance with one embodiment of the invention;

Fig. 2 is a cross section taken substantially on line 2—2 of Fig. 1;

Fig. 3 is a similar cross section through the backing strip with a facing applied thereto;

Fig. 4 is a cross section through the backing and facing strips of Fig. 3, bent into U-shaped or channel-shaped form;

Fig. 5 is a side view of the backing strip constructed in accordance with another embodiment of the invention;

Fig. 6 is a cross section taken substantially on line 6—6 of Fig. 5;

Fig. 7 is a similar cross section through the backing strip with a facing strip applied thereto;

Fig. 8 is a side view of another form of backing strip, somewhat similar to that illustrated in Figs. 5 and 6, but wider;

Fig. 9 is a cross section through the backing strip of Fig. 8 with a facing strip applied thereto, the two being bent into U-shaped or channel-shaped form;

Fig. 10 is a diagrammatic cross section through a backing strip and a facing strip illustrating one manner of attaching them to each other according to the present invention;

Fig. 11 is a diagrammatic view of a backing strip in accordance with another embodiment of the invention, at an incomplete stage of its manufacture and with parts broken away for the sake of clearness;

Fig. 12 is a cross section through the completed backing strip of the form shown in Fig. 11;

Fig. 13 is a view similar to Fig. 12 showing a facing strip applied to the backing strip;

Fig. 14 is a similar cross section through the construction shown in Fig. 13 when bent into U-shaped or channel-shaped form;

Fig. 15 is a diagrammatic side view of a backing strip in accordance with a different embodiment of the invention;

Fig. 16 is a diagrammatic cross section through the same;

Fig. 17 is a similar cross section through the backing strip shown in Fig. 16, with a facing strip secured thereto;

Fig. 18 is a cross section through the backing and facing strips of Fig. 17, bent into U-shaped or channel-shaped form;

Fig. 19 is a diagrammatic cross section through the facing strip shown in Figs. 17 and 18, detached from the backing strip;

Fig. 20 is a side view of part of a backing strip in accordance with still a different embodiment of the invention, with the longitudinal stiffening elements omitted for the sake of clarity;

Fig. 21 is a cross section through the completed backing strip of the form shown in Fig. 20;

Fig. 22 is a cross section through the backing strip of Figs. 20 and 21 with a facing strip applied thereto;

Fig. 23 is a similar cross section showing the strip of Fig. 22 bent into U-shaped or channel-shaped form, and Figs. 24 to 28 are diagrammatic cross sections through still other embodiments of the invention.

The same reference numerals throughout the several views indicate the same parts.

The weather stripping, window cushioning or guiding strip, window channel, or other similar constructions or strips may according to the present invention include a backing strip in combination with a separate facing strip secured to the backing strip. The facing strip is of readily flexible material, such as a layer of flexible woven textile fabric, preferably having means forming one or more cushioning pads thereon, the facing strip being so flexible that it does not provide sufficient stiffness to hold itself in the desired position. The backing strip to which the facing strip is applied provides the desired degree of stiffness for holding the facing strip in the desired configuration or shape. The backing strip is sufficiently flexible so that it may readily be bent to the desired configuration or shape, but it has, at the same time, a degree of stiffness, both longitudinally and transversely, far greater than that of the facing strip, and sufficient under ordinary or normal circumstances to hold or maintain any desired shape or configuration to which it is bent.

One form of backing strip according to this invention is that illustrated in Figs. 1 and 2. These figures, like all of the other figures of the accompanying drawings, should be understood to be more or less diagrammatic. The backing strip comprises two metallic stiffening elements 30 spaced from and substantially parallel to each other and running substantially along two opposite marginal edges of the strip. These stiffening elements are preferably in the form of large wires or small rods of suitable metal, preferably an inert, soft, or substantially non-resilient metal so that when they are bent to any desired shape, they will readily remain in that shape and will not tend to spring back to their original shape.

Connecting these two stiffening elements 30 to each other is a transverse web 31 of buckram, or similar stiff non-metallic woven textile material, preferably a relatively heavy and stiff buckram. The width of the strip of buckram is somewhat greater than the transverse distance between the two stiffening elements 30, and the marginal edges of the buckram strip are turned back upon themselves, around the stiffening elements 30, to overlap the main body of the buckram as indicated at 32. These marginal portions 32 are preferably secured to the main body portions 31 which they overlap, by cementing, although longitudinal lines of stitches 34 may be employed, either in conjunction with or as a substitute for the cementing. Stapling, riveting, or other forms of securing means may also be used to hold the edges of the buckram to the main central body web thereof, if desired.

The buckram is wrapped around the stiffening elements 30 loosely, so that the stiffening elements are not gripped sufficiently tightly to prevent longitudinal movement thereof. The term "loosely" as used here, and as used hereinafter in this specification and the claims, with reference to the gripping or embracing of the longitudinal stiffening elements, is intended to mean that these elements are capable of moving or sliding in a longitudinal direction through or along the buckram or other material or parts which extend around the longitudinal stiffening elements, so that when the construction is bent around corners, the longitudinal stiffening elements, being substantially incompressible and nonextensible in a longitudinal direction, may give or slide somewhat in order to accommodate themselves to the bending. The buckram, being woven of non-metallic strands, is capable of some stretching or compression, as the bending may require, and thus the composite structure of the backing strip may, as a whole, be readily bent to any reasonable shape, such as being bent around a curve in its own plane, around a corner of a window or door opening, or the like.

The buckram 31 may be additionally stiffened by coating or impregnating it with a suitable stiffening coating 33ª, such as sizing, or a cellulosic compoud, latex or other rubber or rubber-like composition, etc. Such additional stiffening of the buckram may be omitted where a rather heavy or stiff grade of buckram is employed, but is preferably used when the buckram is of a light grade.

The buckram and the longitudinal stiffening elements 30 both extend preferably continuously throughout the full length of the weather stripping or other strip, and they constitute the backing strip of one embodiment of this invention. To this backing strip is applied a facing strip (Figs. 3 and 4) of woven textile material 35, preferably woven entirely from non-metallic strands, though some of the strands (either warp strands or weft strands or both) may be of metallic wires or filaments, if additional stiffness in the facing strip is desired. Whether or not such metallic filaments are employed in the facing strip, the facing strip is materially less stiff or rigid than the backing strip, and it is the backing strip, rather than the facing strip, which mainly provides the desired degree of stiffness in the finished article to cause it to retain any shape or configuration to which it is bent.

The facing strip 35 is preferably of a width initially somewhat greater than the width of the finished backing strip, and may be of a width approximately the same as that of the original buckram strip 31 before the marginal edges of this buckram strip are turned back around the stiffening elements 30. The marginal edges of the facing strip 35 are doubled back around the edges of the backing strip, as shown in Fig. 3, and are secured in place as by means of stitching 36, or by cement or adhesive, or by both stitching and cement. Conveniently, the stiffening material 33 on the backing strip may be of an adhesive character, and the facing strip 35 may be applied to the backing strip while this stiffening material 33 is still plastic or before it sets, so that this same stiffening material may serve also as an adhesive for securing substantially the entire area of the facing strip to the backing strip.

The facing strip is provided with means forming one or more cushioning pads for engagement with a window or door, when this construction is applied to a frame of a window or door, or for engagement with a window frame or door frame when this construction is applied to the window or door itself. When this construction is used only along one surface of a window or door, or to contact with only one surface of a window or door, the cushioning pad may be in the form of a single zone or strip extending longitudinally along the weather stripping, and having any desired width with respect to the width of the entire weather strip. When the weather strip is intended to be bent transversely into U-shaped or channel-shaped form, to embrace or extend around the edge of a window, door, or panel, as illustrated in Fig. 4, then the cushioning means may conveniently be in the form of three separate cushioning zones or strips 38, each extending longitudinally of the weather strip, the middle one of such cushioning zones being adapted to contact with an edge surface of the window, door, or panel, while the two side zones are adapted to contact with two opposite side surfaces of the window, door, or panel, near the edge thereof.

It is seen that the foregoing construction provides a weather strip or the like which may be used in flat form (as in Fig. 3) or in U-shaped or channel-shaped form (as in Fig. 4) and which, due to the flexibility of the various elements making up the strip, may be bent around corners or formed into any desired configuration within reason. The longitudinal stiffening elements 30 hold the marginal edges of the strip in straight, true alinement, except where curves are purposely introduced, and the stiffness of the web portion 31 of the backing strip together with the stiffness of the longitudinal elements 30, adequately holds the finished construction in the desired shape. This construction is relatively easy and inexpensive to manufacture, and highly satisfactory in use.

The cushioning means or cushioning pads 38, both in this embodiment of the invention and in the alternative embodiments hereafter described, may be of any convenient or desired form, although it is generally preferred to make them of relatively long, stiff pile formed by textile threads interwoven with those of the textile layer 35.

In the modified backing strip shown in Figs. 5 and 6, the edge rods or wires 40 are employed, as before, and the main body portion 41 of the backing strip is here made of strands of paper (such as twisted kraft paper or similar material) braided or woven into tubular form. When it is originally formed, the body 41 is an open tube, and the stiffening wires or rods 40 extend through this tube. Then, either as a separate operation, or concurrently with the weaving or braiding of the tube, the tube with the wires in it is run through squeezing rolls and squeezed down to the flat form illustrated in Figs. 5 and 6, with the wires or rods 40 substantially at opposite marginal edges.

The paper strands or other suitable strands from which this body 41 is woven may, if desired, be steamed or otherwise softened preparatory to passage through the squeezing rolls, so that after the tube is squeezed down to the flat form and has dried, it will better retain its shape. If desired, the woven or braided body 41 may be impregnated or coated with sizing or other stiffening compositions, as disclosed above in connection with the body 31 of the previous embodiment.

As in the case of the previous embodiment, this embodiment of backing strip shown in Figs. 5 and 6 may be bent to any desired shape, and will retain the shape to which it is bent, the wires or rods 40 being loosely embraced by the material 41 so as to be capable of longitudinal movement with respect to the material. Fig. 5 illustrates the backing strip bent through several curves in its own plane.

Fig. 7 illustrates this same backing strip of Figs. 5 and 6, with a facing strip 45 secured thereto either by stitches 46, or by adhesive, or by both stitches and adhesive. The facing strip may be constructed in the manner above disclosed in connection with the previous facing strip 35, and it may have one or more cushioning or padding portions 48, preferably in zones running lengthwise of the strip, this cushioning or padding being of any of the forms above disclosed in connection with the cushioning 38 of the previous embodiment.

Figs. 5, 6, and 7 illustrate a relatively narrow backing strip and only a single line or zone of cushioning material 48 on the facing strip 45 secured to the backing strip. The backing strip and facing strip may, of course, be made of any desired width, and a wider form of similarly constructed backing strip is indicated in Fig. 8, where the stiffening wires or rods are indicated at 50 and the main body or web of braided or woven tubular form is indicated at 51. As before, the tubular body 51 is preferably braided from twisted paper strands, though either of the tubular bodies 41 and 51 may be woven of linen or cotton threads or other suitable textile material. As in the case of the previous embodiment, the body 51 is run through squeezing rolls to flatten it, and it may be steamed or otherwise softened before flattening, and coated or impregnated with stiffening material, sizing, or the like, all as above described in connection with the bodies 31 and 41 of the previous embodiment.

This wider body 51 is adapted either to be used flat, or to be bent into U-shaped or channel-shaped form, such U-shaped form being illustrated in Fig. 9. In this figure, a facing strip 55 is applied to the backing strip by means of stitches 56, or adhesive, or both, and this facing strip carries one or more cushioning pads 58, three zones of cushioning pads being illustrated in Fig. 9, like those of Fig. 4. The facing strip may be of the same construction described in connection with Figs. 3 and 4.

In Fig. 10 there is shown a diagrammatic cross section through a backing strip 31a, which may be the same as the buckram backing strip 31 previously described, or may be of a tubular form previously illustrated at 41 and 51, or of other suitable forms. This modification shown in Fig. 10 is intended to illustrate that, if desired, stiffening material 33a may be used on that face of the backing strip which is remote from the facing strip, instead of on the face toward the facing strip as in Fig. 2, and the facing strip, here shown at 35a may be secured to the backing strip by latex or other suitable cement 39a different in kind or character from the stiffening material 33a.

A slightly different embodiment of backing strip is illustrated diagrammatically in Figs. 11 and 12. Here, the body portion or web portion of the backing strip is formed by transverse strands 61 of small flexible metallic wire, preferably of an inert, non-resilient metal, like that employed for the longitudinal stiffening elements. These strands 61 are preferably turned back upon themselves at the lateral edges of the web, to form a selvage edge. The wire strands 61 are materially spaced from each other in a direction longitudinally of the strip, as shown, and are held in such spaced relation by warp strands which may be either of metal or of non-metallic material, preferably the latter. Warp strands of linen or cotton are found highly satisfactory in use.

Preferably the warp strands do not extend across the full width of the web but are confined to a plurality of spaced zones. For instance, a few warp strands 62 are interwoven with the transverse or weft strands 61 substantially at the extreme marginal edges of the weft strands. Then there is a space inwardly of these warp strands 62 where there are no warp strands, and farther inwardly beyond this free space there is a zone of other warp strands 63, there being a substantial space free of warp strands between the two zones of strands 63, all as shown clearly in Fig. 11.

This web or body portion of the backing strip, in this form of the invention, is somewhat wider than the final width between the two spaced longitudinal stiffening elements 60, and the extreme marginal edges of the web are doubled back around the stiffening elements 60, just as in the case of the first embodiment described in connection with Figs. 1 and 2. In this form, as in all of the other forms of the invention, the longitudinal stiffening elements 60 are embraced loosely, so as to be capable of longitudinal sliding with respect to the web portion of the backing strip. As indicated in Figs. 11 and 12, the stiffening elements 60 lie on the web along lines between the warp strands 62 and the warp strands 63, so that there are preferably no warp strands immediately adjacent the stiffening elements 60. When the marginal edges of the web are turned back over the elements 60, the strands 62 overlie the strands 63, as indicated in Fig. 12.

Fig. 13 illustrates the form of backing strip above described in connection with Figs. 11 and 12, with a facing strip 65 secured thereto by means of stitches 66, or adhesive, or both. The facing strip may have one or more zones of cushioning means 68 formed thereon. The facing strip and cushioning means may be constructed the same as above described in connection with the strip 35 and cushioning means 38 of Fig. 3.

The weather stripping in this form of the invention, as in the other forms, may be used either flat as in Fig. 13, or bent up into U-shaped or channel-shaped form as shown in Fig. 14, so as to embrace the edge of a window, door, panel, or the like.

Still another embodiment of backing strip is illustrated in Figs. 15 and 16. As before, the longitudinal stiffening elements such as the wires or rods 70, are of inert metal. The web or main body of the backing strip is here formed of wire strands 71 extending across the strip from one element 70 to the other, and conveniently referred to as weft strands. These strands are here looped around the longitudinal elements 70, as shown. The weft strands may be actually woven around the elements 70 in the initial weaving of the backing strip, or they may be initially woven with open loops or bights at the marginal edges of the strip, and the element 70 later be inserted through these open loops, but in either event the strands 71 embrace or encircle the elements 70 loosely, so that the elements 70 are capable of longitudinal sliding movement.

The weft strands 71, like the strands 61 previously described, are preferably of small flexible wire which is inert or substantially non-resilient, so as to retain any shape to which it is bent, without tending to spring back substantially to its original shape. The strands 71 are substantially spaced from each other in a direction longitudinally of the strip, as in the case of the strands 61, and as shown plainly in Fig. 15. They are held in proper spaced relation to each other by warp strands interwoven with the weft strands 71, which warp strands, as in the previous embodiment, preferably do not occupy the full width of the web of the backing strip, but only a small part of the width. For instance, there may be a few warp strands 72 in a zone spaced somewhat inwardly from the marginal longitudinal stiffening elements 70, as shown, and then there may be a further space without warp strands, and somewhat inwardly from the strands 72 there may be a further zone of warp strands 73. As in the case of the embodiment illustrated in Figs. 11 and 12, the warp strands 72 and 73 may be of linen, cotton, or other non-metallic material if desired, although in this embodiment of the invention it is preferred to have all of the warp strands 72 and 73, like the weft strands 71, of small flexible wires. Again, some of the warp strands may be of metallic wires and others may be of non-metallic threads, if desired, but this arrangement is not preferred in this particular embodiment of the invention.

As shown in Fig. 17, a facing strip 75 may be applied to the form of backing strip shown in Figs. 15 and 16, and be secured thereto by stitches 76, or adhesive, or both. This facing strip 75 may be constructed the same as above described in connection with the facing strip 35, and preferably carries one or more lines or zones of cushioning or padding material 78 like the cushioning material 38 previously described. As in the previous embodiment, the facing strip is preferably of greater width than the backing strip, the marginal edges of the facing strip being turned back around the edges of the backing strip, as shown in Fig. 17.

The weather stripping may be used in the flat form of Fig. 17, or may be bent up into U-shaped or channel-shaped form as illustrated in Fig. 18. If the weather stripping is intended to be bent into channel-shaped form, the zones of warp strands 73 are preferably so spaced on the backing strip that they will come at the corners of the U-shaped or channel-shaped cross section, as indicated in Fig. 18, and thus serve as guide lines along which the strip may be bent, assisting in true and accurate bending thereof. These warp strands 73 along the corners of the channel-shaped body may be arranged somewhat closer to each other than the warp strands 72, which are spaced farther apart as plainly seen in Fig. 15.

Fig. 19 illustrates the facing strip 75 separate from the backing strip and ready to be applied thereto. This facing strip shown in Fig. 19 might be any of the facing strips 35, 55, 65, or 75, since all of the facing strips may be of identical construction, if desired, irrespective of differences in the backing strips.

Fig. 18 also illustrates another feature of the invention, namely, the split tubes or beads 79 applied to the edges of the weather stripping. Such beads or tubes may be of any suitable sheet material, Celluloid or molded composition, but are preferably made of sheet metal of an inert, non-resilient kind. The longitudinal stiffening elements 30, 40, 50, 60, etc., running along the edges of the weather strip, provide enlargements along these edges which are well adapted to be gripped by split tubes or beads such as indicated at 79, so that the tubes or beads are held on the edges of the weather stripping against lateral displacement therefrom. Although these tubes or beads have been omitted from most of the figures of the drawings in order to simplify the illustration, it should be understood that such split tubes or beads may be applied to one or both marginal edges of any of the different forms of the invention disclosed in this application, and irrespective of whether the weather stripping is to remain permanently in flat form as shown in Figs. 3, 7, 13, etc., or whether it is bent up into channel-shaped or U-shaped form such as shown in Figs. 4, 9, 14, etc. In any event, the beads or split tubes embrace the edges of the weather stripping sufficiently tightly to prevent lateral displacement of the beads or tubes, but sufficiently loosely so that the beads or tubes may slide longitudinally along the edges of the weather stripping, and sufficiently loosely so that they do not interfere with the sliding of the longitudinal stiffening elements 30, 40, 50, etc., along the stripping.

Still another embodiment of backing strip is illustrated diagrammatically in Figs. 20 and 21. Here, the longitudinal stiffening elements, which may be the same as those previously described, are indicated at 80, and the web or main body of the backing strip is indicated at 81. This web or body is a strip of woven wire netting, preferably of the rectangular type, with a series of spaced strands running in one direction and an interwoven series of spaced strands running in another direction substantially at right angles to the first mentioned strands. All of the wire strands are of inert or substantially non-resilient wire. The netting used according to the present invention, unlike the ordinary fly-screening or other netting, is not galvanized or otherwise treated in any way which will fasten the wire strands to each other at the points where they cross each other. In other words, the strands are merely interwoven with each other without actually being rigidly secured or attached at their crossing points. Thus the various strands are capable of considerably more movement with respect to each other than in the case of the more usual galvanized netting, and this special netting of present invention is, therefore, well adapted to be bent to the desired shapes or configurations customarily encountered in practice, whereas the conventional netting with the strands rigidly secured to each other where they cross each other could not be bent in this way.

The strip of netting 81 is made substantially wider than the intended width of the backing strip as defined by the distance between the longitudinal elements 80, and the marginal edges of the netting, beyond the elements 80, are turned back loosely around the elements and overlapped with the main body portion of the netting, as plainly seen in Fig. 21, and in a manner similar to the turning back of the edges of the buckram strip 31 above described in connection with Figs. 1 and 2. It is found that when the special wire netting above described is bent around the longitudinal stiffening elements 80 in this manner, the wire netting may then be readily bent to desired reasonable shapes. This is apparently due to the fact that the edges of the netting are of double thickness because they are bent around the rods or wires 80, and due to the stiffening effect produced partly by this double thickness along the edges and partly by the stiffening elements 80. Hence, it is found in practice that the netting does not buckle seriously even when bent in curves in its own plane such as the curves around corners of window or door openings.

In Fig. 22 there is illustrated the backing strip above described in connection with Figs. 20 and 21, with the facing strip 85 secured thereto by means of stitching 86, or adhesive, or both, the facing strip being provided with cushioning means 88. The facing strip and cushioning means may be constructed the same as in the previously described forms. The weather strip may be used in flat form as shown in Fig. 22, or it may be bent up into U-shaped or channel-shaped form as illustrated in Fig. 23, to embrace the edge of a window, door, panel, or other suitable member indicated diagrammatically at W.

The above mentioned split tubes or beads are shown also in Fig. 23 at 89. As above stated in connection with the split tubes 79, such split tubes may be used on one or both edges of any of the forms of the invention, or may be entirely omitted, as desired.

In Figs. 24 to 28, inclusive, there are illustrated a few additional embodiments which employ, as a backing strip, the wire netting of the special type above described in connection with Figs. 20 and 21. Referring to Fig. 24, a strip 91 of such netting is used as a backing strip and a facing strip 92 of woven textile fabric or the like is secured to the backing strip as by means of stitches 93, the edges of the facing strip being doubled back around the edges of the backing strip, as shown. Cushioning means 94, like the other cushioning means previously described, is present in one or more zones on the face of the facing strip 92. No longitudinal stiffening rods or wires are employed along the edges of the strip in this construction.

In Fig. 25, the backing strip 96 may be of the same netting, with a facing strip 97 secured thereto as by means of stitches 98, the facing strip carrying cushioning material 99. The difference between Figs. 24 and 25 is that in Fig. 25 the weather stripping is bent into angular shape with two flanges, the cushioning material 99 being located on one of these flanges. The weather stripping may, of course, be bent into any desired cross sectional shape, depending on the use to which it is to be put.

The construction of Fig. 26 is similar to that of Fig. 24, including the backing strip 101 of the special netting above mentioned and the facing strip 102. In this embodiment, however, the edges of the backing strip are bent back upon themselves as indicated at 103 and the edges of the facing strip are bent back twice upon themselves so that the extreme edges 104 are clamped between the doubled back portions 103 and the main body portions 101 of the backing strip. These interlocked edges are sufficient to hold the facing strip on the backing strip without the necessity of stitching or adhesive, although either stitching, or adhesive, or both, may be additionally used if desired. As before, cushioning material 105 is employed.

The construction shown in Fig. 27 is generally similar to that of Fig. 26, except that longitudinal stiffening rods or wires 110 are here employed, and the strip of netting 111 is bent around these edge rods or wires 110 in a manner generally similar to Fig. 21. The facing strip 112 has edges 113 interposed between and firmly clamped by the bent back marginal edges of the netting 111, in a manner somewhat similar to the arrangement in Fig. 26, so that no stitching or adhesive is needed, though either or both of these forms of fastening may be employed if desired. Cushioning 114 is provided on the facing strip.

Finally, in the embodiment shown in Fig. 28, the backing strip 121, of the same special netting above described, is provided with a facing strip 122 whose edges are turned back around the edges of the backing strip as shown, and held in place by split tubes or beads 123, which firmly hold the edges of the facing strip around the edges of the backing strip, although the split tubes or beads are capable of sliding longitudinally with respect to the facing and backing strips. One or more zones of cushioning material 125 may be employed on the facing strip 122.

In most or all of the forms of the invention, it is preferred to associate the edge stiffening wires or rods 30, 60, 70, 80, 110, etc., with the transverse stiffening material or web portion of the backing strip before the backing strip and the facing strip are secured to each other. This is not essential, however, and it is within the scope of this invention first to associate the facing strip with the web portion of the backing strip, and then apply the edge stiffening wires or rods. This last mentioned order of construction is especially suitable in connection with the forms of backing strip disclosed in Figs. 11 to 14, inclusive, and in Figs. 20 to 23, inclusive. The web portion including the wires 61 (Figs. 11 to 14) may first be sewn, cemented, or otherwise secured to the facing strip 65, without the edge stiffening wires 60, and the wires 60 may then be applied and the marginal edges of the facing strip and web portion bent back around the wires 60 to embrace these wires loosely. Likewise, in the case of the netting 81 (Figs. 20 to 23), this netting may first be sewn, cemented, or otherwise secured to the facing strip 85, and then the edge wires 80 may later be applied and the marginal portions of the facing strip and netting bent backwardly around the wires to embrace them loosely.

The same procedure could be followed with respect to the other embodiments of the invention in which the edge wires or rods are employed, especially the embodiments of Figs. 1 to 4, Figs. 15 to 18, and Fig. 27.

If the transverse stiffening wires are applied to the facing strip before the longitudinal wires are applied to the transverse wires, and stitched to the facing strip, the stitching of the wires to the facing strip will adequately hold the wires in proper position with relation to each other so that the warp strands such as shown at 62 and 63 in Fig. 1 could be omitted. In other words, these warp strands are desirable in order to hold the weft strands or transverse wires 61 in proper position with relation to each other, if the longitudinal stiffening wires 60 are to be applied to the web portion before the facing strip is applied. But if, on the other hand, the wires 61 are applied to and immediately stitched onto the facing strip, the stitches which hold the wires 61 to the facing strip will serve to prevent displacement of the wires relative to each other, so that the warp strands 62 and 63 can conveniently be omitted if desired. The transverse strands 61 can be applied to the back of the facing strip from a continuous reel of wire, bent and laid in zigzag form on the back of the facing strip as the facing strip is fed through a sewing or knitting machine which will sew or knit the zigzag loops or back and forth loops of wire to the facing strip. Then the wires 60 can be applied, and the edges of the facing strip (with wires 61 secured thereto) can be bent around the wires 60 to embrace them loosely.

While certain embodiments of the invention have been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. Weather stripping or the like comprising two metallic rods arranged substantially parallel to each other and substantially along two opposite marginal edges of the strip, transverse stiffening means extending across said strip from each of said rods to the other and extending loosely around each of said rods, and thence back upon itself for a substantial distance in a reverse direction from each rod toward the other rod, both of said rods being capable of longitudinal movement with respect to said stiffening means, a layer of textile fabric separate from said stiffening means overlying said stiffening means and secured thereto, and means on said fabric layer forming a cushioning pad of substantial thickness.

2. Weather stripping or the like comprising two metallic stiffening elements arranged substantially parallel to each other and substantially along two opposite marginal edges of the strip, transverse stiffening means extending across said strip from each of said stiffening elements to the other, said stiffening means having metallic wire portions extending transversely between said marginal stiffening elements and loosely around both of said elements and thence back upon themselves in a second layer extending a substantial distance in a reverse direction from each marginal stiffening element toward the opposite one, said wire portions embracing said marginal elements sufficiently loosely so that both of said elements are capable of longitudinal sliding movement with respect to said transverse stiffening means, a layer of woven textile fabric separate from said transverse stiffening means overlying said stiffening means and secured thereto, a plurality of rows of stitching running longitudinally along said weather stripping and connecting said textile fabric layer to said transverse stiffening wire portions, and means on said fabric layer forming a cushioning pad of substantial thickness.

3. Weather stripping or the like comprising a bendable backing strip having sufficient stiffness to maintain under normal conditions of use the shape to which it is bent, and a facing strip of materially less stiffness secured to and carried by said backing strip, said backing strip including two metallic stiffening elements arranged substantially parallel to each other and running longitudinally substantially along two opposite marginal edges of the backing strip and transverse stiffening means extending across said backing strip from one of said marginal edges to the other, said transverse stiffening means including portions wrapped around each of said longitudinal stiffening elements and thence extending back upon themselves for a substantial distance in a direction toward the opposite longitudinal stiffening element and embracing said longitudinal stiffening elements sufficiently loosely so that said stiffening elements may slide longitudinally with respect to said transverse stiffening means, said facing strip including a layer of woven textile material and means on said layer forming a cushioning pad of substantial thickness.

4. A construction according to claim 3, in which said transverse stiffening means is formed at least in part from non-metallic strands.

5. A construction according to claim 3, in which said transverse stiffening means is formed at least in part from non-metallic strands running transversely from one of said longitudinal stiffening elements to the other.

6. A construction according to claim 3, in which said transverse stiffening means is formed at least in part of metallic strands.

7. A construction according to claim 3, in which said transverse stiffening means is formed at least in part of metallic strands running transversely from one of said longitudinal stiffening elements to the other, and further including stitching running longitudinally of said weather stripping and connecting said facing strip to said backing strip.

8. A construction according to claim 3, in which said transverse stiffening means is formed at least in part of transverse weft strands of metallic wire, adjacent weft strands being spaced substantial distances from each other in a direction longitudinally of said strip, and warp strands of non-metallic material interwoven with said weft strands for holding said weft strands in proper spaced relation to each other.

CHARLES P. SCHLEGEL.